(12) United States Patent
Izzy et al.

(10) Patent No.: US 7,819,134 B2
(45) Date of Patent: Oct. 26, 2010

(54) VALVE FITTING WITH INTEGRAL STOPS

(75) Inventors: Zuhair A. Izzy, Carmel, IN (US); Scott K. Jones, Westfield, IN (US); Jeffrey W. McCormack, Fishers, IN (US); Derek Allen Brown, Lizton, IN (US); Adam M. DeVries, Anderson, IN (US)

(73) Assignee: Masco Corporation of Indiana, Indianapolis, IN (US)

(*) Notice: Subject to any disclaimer, the term of this patent is extended or adjusted under 35 U.S.C. 154(b) by 445 days.

(21) Appl. No.: 11/899,093

(22) Filed: Sep. 4, 2007

(65) Prior Publication Data

US 2009/0057591 A1 Mar. 5, 2009

(51) Int. Cl.
E03C 1/04 (2006.01)
(52) U.S. Cl. ............................ 137/606; 251/288
(58) Field of Classification Search ............ 137/597, 137/606, 892; 251/288
See application file for complete search history.

(56) References Cited

U.S. PATENT DOCUMENTS

| | | | |
|---|---|---|---|
| 32,201 A | 4/1861 | Neumann | |
| 425,442 A | 4/1890 | Luce | |
| 811,813 A | 2/1906 | Anderson | |
| 1,135,280 A | 4/1915 | Hamilton | |
| 1,497,473 A | 6/1924 | Bartley | |
| 1,930,590 A * | 10/1933 | Ebinger | 137/505 |
| 2,507,467 A * | 5/1950 | Fredrickson et al. | 4/678 |
| 3,370,709 A * | 2/1968 | James | 210/234 |
| 3,374,957 A * | 3/1968 | Tyler | 241/33 |
| 3,529,621 A | 9/1970 | Christiansen | |
| 3,570,537 A | 3/1971 | Kelly | |
| 3,609,774 A | 10/1971 | Allgood | |
| 4,064,900 A * | 12/1977 | Schmitt | 137/315.12 |
| 4,493,338 A | 1/1985 | Petursson | |
| 4,654,900 A | 4/1987 | McGhee | |
| 4,763,687 A | 8/1988 | Arth et al. | |
| 4,896,381 A | 1/1990 | Hutto | |
| 4,899,397 A | 2/1990 | Crawford et al. | |
| 4,901,750 A | 2/1990 | Nicklas et al. | |
| 4,976,460 A * | 12/1990 | Newcombe et al. | 236/12.12 |
| 4,979,530 A * | 12/1990 | Breda | 137/100 |
| 4,981,156 A | 1/1991 | Nicklas et al. | |
| 5,355,906 A | 10/1994 | Marty et al. | |
| 5,725,010 A | 3/1998 | Marty et al. | |
| 5,884,652 A * | 3/1999 | Yeh et al. | 137/98 |
| 6,095,176 A * | 8/2000 | Yang | 137/98 |
| 6,196,523 B1 | 3/2001 | Miyata et al. | |
| 6,321,777 B1 | 11/2001 | Wu | |
| 6,453,943 B1 * | 9/2002 | Chang | 137/597 |
| 6,863,085 B2 | 3/2005 | Marty et al. | |
| 7,188,641 B2 * | 3/2007 | Yang | 137/597 |

(Continued)

OTHER PUBLICATIONS

Delta Model R10000, Multichoice™ Rough-in Body installation instructions, Jun. 5, 2006, 3 pgs.

(Continued)

*Primary Examiner*—John Fox
(74) *Attorney, Agent, or Firm*—Baker & Daniels LLP

(57) ABSTRACT

A valve fitting including a mixing valve housing, a first stop valve configured to control the flow of fluid through a first inlet, and second stop valve configured to control the flow of water through a second inlet.

8 Claims, 9 Drawing Sheets

U.S. PATENT DOCUMENTS

| | | | |
|---|---|---|---|
| 7,647,942 B2 * | 1/2010 | Weston | 137/503 |
| 2006/0231140 A1 | 10/2006 | McNerney | |
| 2007/0056639 A1 | 3/2007 | McNerney | |

OTHER PUBLICATIONS

Engineering print of valve body with stops, Delta Faucet Company, at least as early as Mar. 28, 2007, 1 pg.

* cited by examiner

VALVE FITTING WITH INTEGRAL STOPS

BACKGROUND AND SUMMARY OF THE INVENTION

The present invention relates generally to a valve body or fitting and, more particularly, to a valve fitting including integral stops.

Conventional shower installations are known to often include both a tub spout and a shower head. The tub spout and the shower head are often connected to a single valve fitting positioned within a wall. The valve fitting typically includes inlets for hot and cold water, and outlets in fluid communication with the shower head and the tub spout. A diverter valve is typically coupled to the tub spout so that in a first position the diverter valve allows water to exit through the tub spout and in a second position the diverter valve closes off the outlet through the tub spout, thereby forcing the water up through a shower riser to the shower head.

According to an illustrative embodiment of the present disclosure, a valve fitting includes a mixing valve housing having a sidewall and a bottom wall defining a cavity with a longitudinal housing axis. A first inlet is coupled to the housing and includes a first inlet bore having a longitudinal first inlet axis. A first supply port is in fluid communication with the cavity of the housing. A first stop valve includes a first valve seat supported within the first inlet, a first receiving bore intersecting the first inlet bore and having a longitudinal first stop axis angularly offset relative to the housing axis and the first inlet axis, and a first stem movable along the first stop axis. The first stem includes a seal configured to selectively engage the first valve seat to control water flow from the first inlet to the first supply port. A second inlet is coupled to the housing and includes a second inlet bore having a longitudinal second inlet axis. A second supply port is in fluid communication with the cavity of the housing. A second stop valve includes a second valve seat supported within the second inlet, a second receiving bore intersecting the second inlet bore and having a longitudinal second stop axis angularly offset relative to the housing axis and the second inlet axis, and a second stem movable along the second stop axis. The second stem includes a seal configured to selectively engage the second valve seat to control water flow from the second inlet to the second supply port.

According to a further illustrative embodiment of the present disclosure, a valve mounting assembly includes a valve body having a first inlet, a second inlet positioned in spaced relation to the first inlet, a first receiving bore intersecting the first inlet, and a second receiving bore intersecting the second inlet. The valve body defines a longitudinal axis. A first stop actuator includes a first input end and a first piston operably coupled to the first input end. The first piston is received within the first receiving bore for movement between open and closed positions to control fluid flow through the first inlet. A second stop actuator includes a second input end and a second piston operably coupled to the second input end. The second piston is received within the second receiving bore for movement between open and closed positions to control fluid flow through the second inlet. A plaster guard is operably coupled to the valve body and includes a base having a central opening to receive a portion of the valve body and a rectangular flange supported by the base and positioned in spaced relation to the central opening. The flange includes an outer edge positioned in spaced relation to the base and defining an outer plane transverse to the longitudinal axis. The input ends of the first and second stop actuators, in both the open and closed positions, are laterally positioned within the flange of the plaster guard and longitudinally positioned inwardly of the outer plane of the plaster guard.

According to another illustrative embodiment of the present disclosure, a valve fitting includes an inlet bore having an inlet axis. A receiving bore intersects the inlet bore and extends across the inlet bore between opposing proximal and distal ends. A valve seat is supported proximate the distal end. A retainer is positioned at the proximal end of the receiving bore and includes a plurality of internal threads. A stem includes a piston supported within the receiving bore for movement across the inlet axis from an open position to a closed position. A seal is supported by the piston and is configured to engage the valve seat when the piston is in the closed position to prevent fluid flow through the inlet. A shaft is coupled to the piston and includes external threads engageable with the internal threads of the retainer to move the piston between the open position and the closed position.

According to a further illustrative embodiment of the present disclosure, a method of controlling fluid flow to a mixing valve housing from an inlet includes the step of providing a valve fitting including a mixing valve housing, an inlet defining an inlet bore, and a stop actuator for selectively fluidly coupling the mixing valve housing with the inlet bore. The method further includes the steps of providing a plaster guard including a flange positioned around the mixing valve housing, and accessing an input end of the stop actuator, wherein the input end is positioned within a plaster guard. The method further includes the step of moving the stop actuator to control a piston supporting a seal, wherein the seal moves across the inlet bore to engage a valve seat for preventing fluid flow through the inlet.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiment selected for description have been chosen to enable one skilled in the art to practice the invention.

Figure 1:
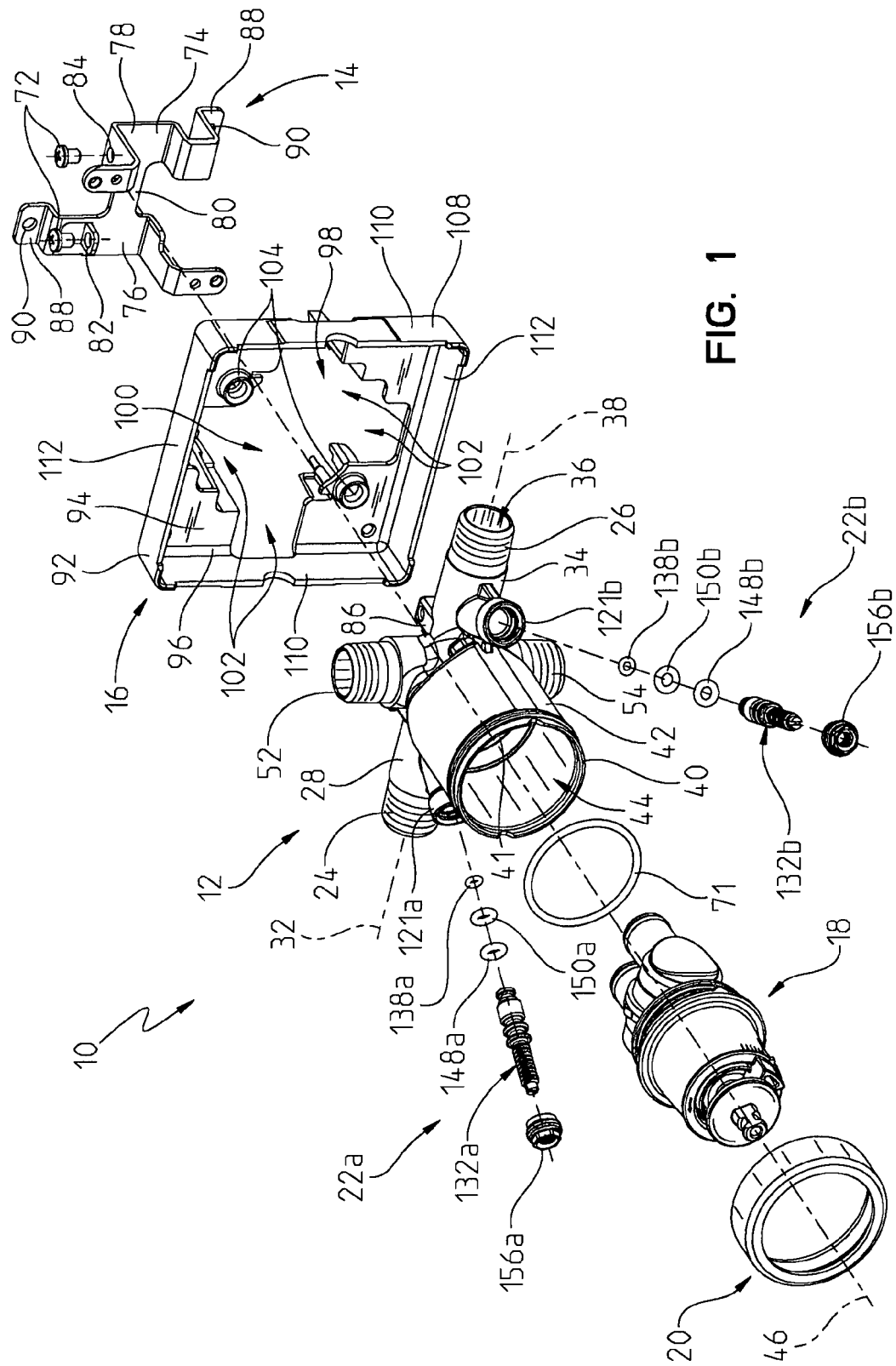
FIG. 1 is an exploded perspective view of a mixing valve assembly including a valve fitting according to an illustrative embodiment of the present disclosure.
Figure 2:
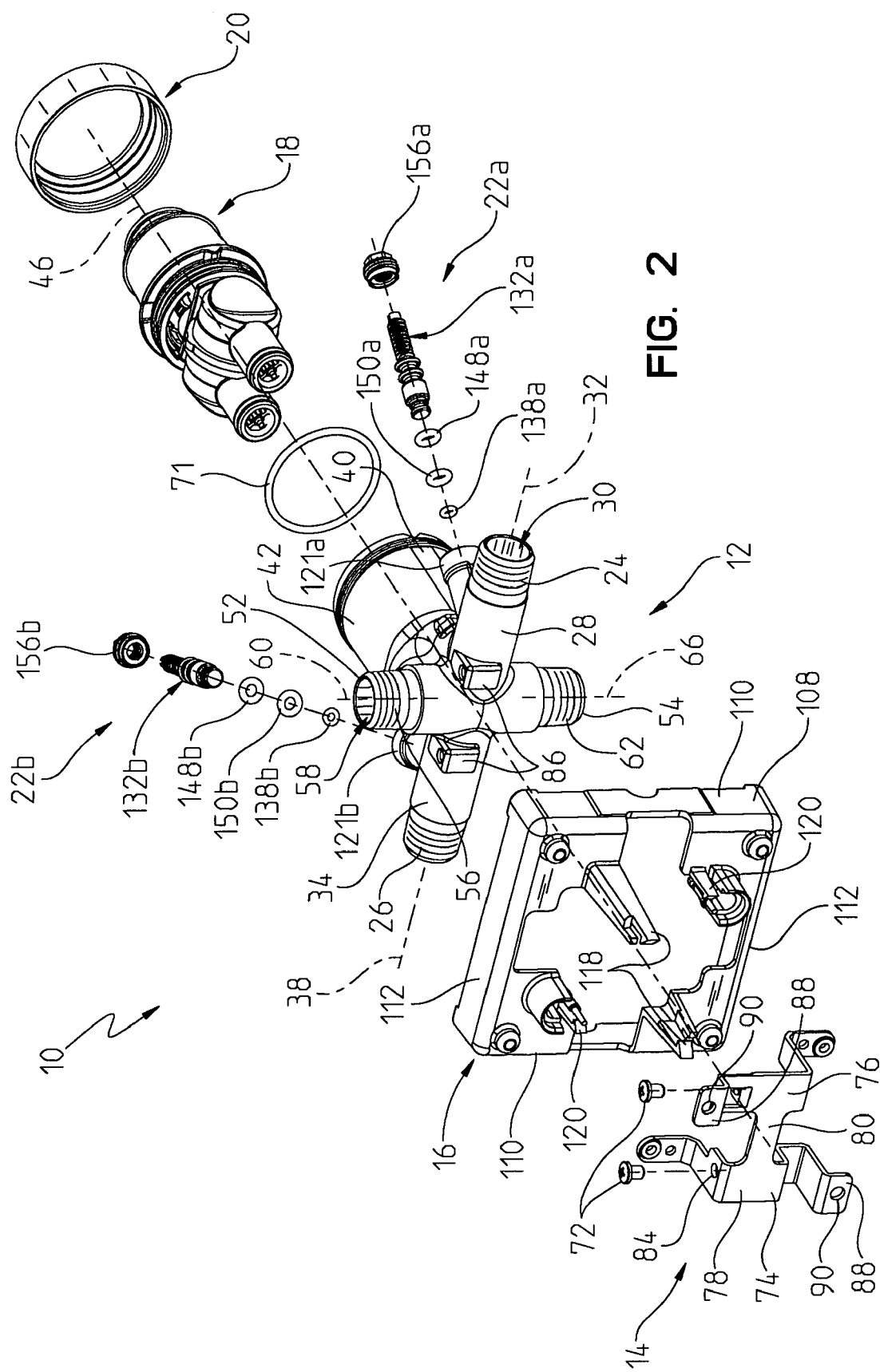
FIG. 2 is a rear exploded perspective view of the mixing valve assembly of FIG. 1.
Figure 3:
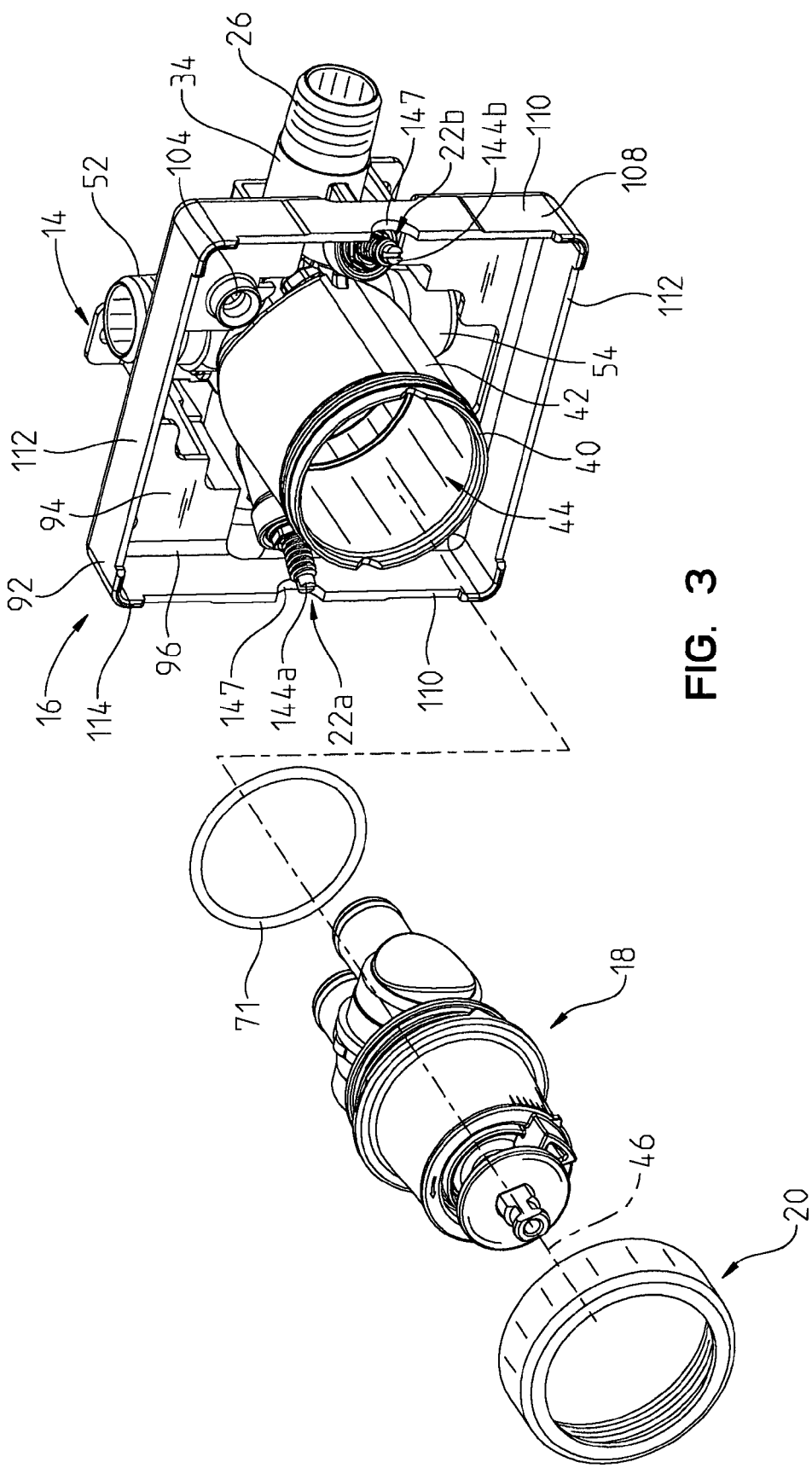
FIG. 3 is a partially exploded perspective view of the mixing valve assembly of FIG. 1.

Referring initially to FIGS. 1-3 of the drawings, an illustrative mixing valve assembly 10 includes a valve body or fitting 12 coupled to a mounting bracket 14 which, in turn, is coupled to a plaster guard 16. A mixing valve cartridge 18 is illustratively received within the valve fitting 12 and secured thereto through a bonnet or collar 20. Stop valves 22a and 22b are also received within the valve fitting 12.

With reference to FIGS. 1, 2, 4, and 5, the valve fitting 12 includes a first or hot water inlet 24, which is configured to be fluidly coupled to a conventional hot water supply (not shown), and a second or cold water inlet 26, which is configured to be fluidly coupled to a conventional cold water supply (not shown). The hot water inlet 24 includes a tubular body 28 defining a first or hot water inlet bore 30 having a longitudinal hot water inlet axis 32. Similarly, the cold water inlet 26 includes a tubular body 34 defining a cold water inlet bore 36 having a longitudinal cold water inlet axis 38. In the illustrative embodiment, the cold water inlet axis 38 is co-axially aligned with the hot water inlet axis 32.

Figure 6:
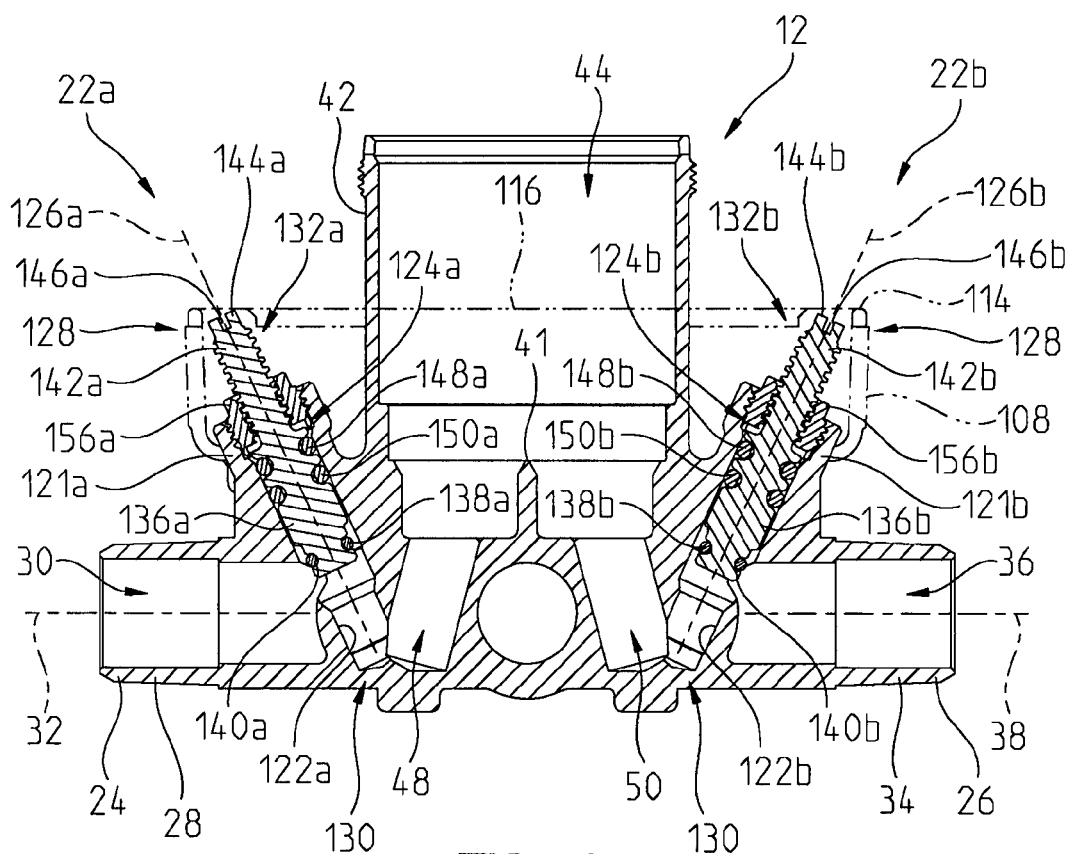
FIG. 6 is a cross-sectional view taken along line 6-6 of FIG. 4, with the stop actuators shown in open positions.
Figure 7:
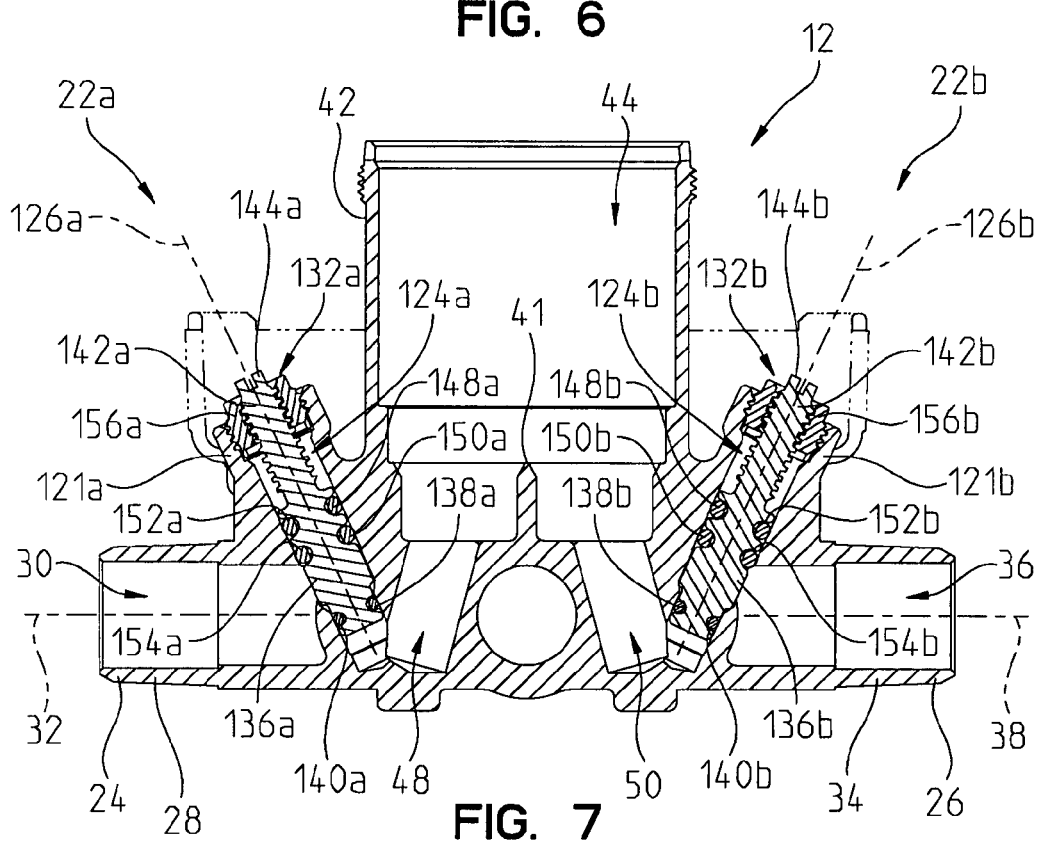
FIG. 7 is a cross-sectional view similar to FIG. 6, with the stop actuators shown in closed positions.
Figure 8:
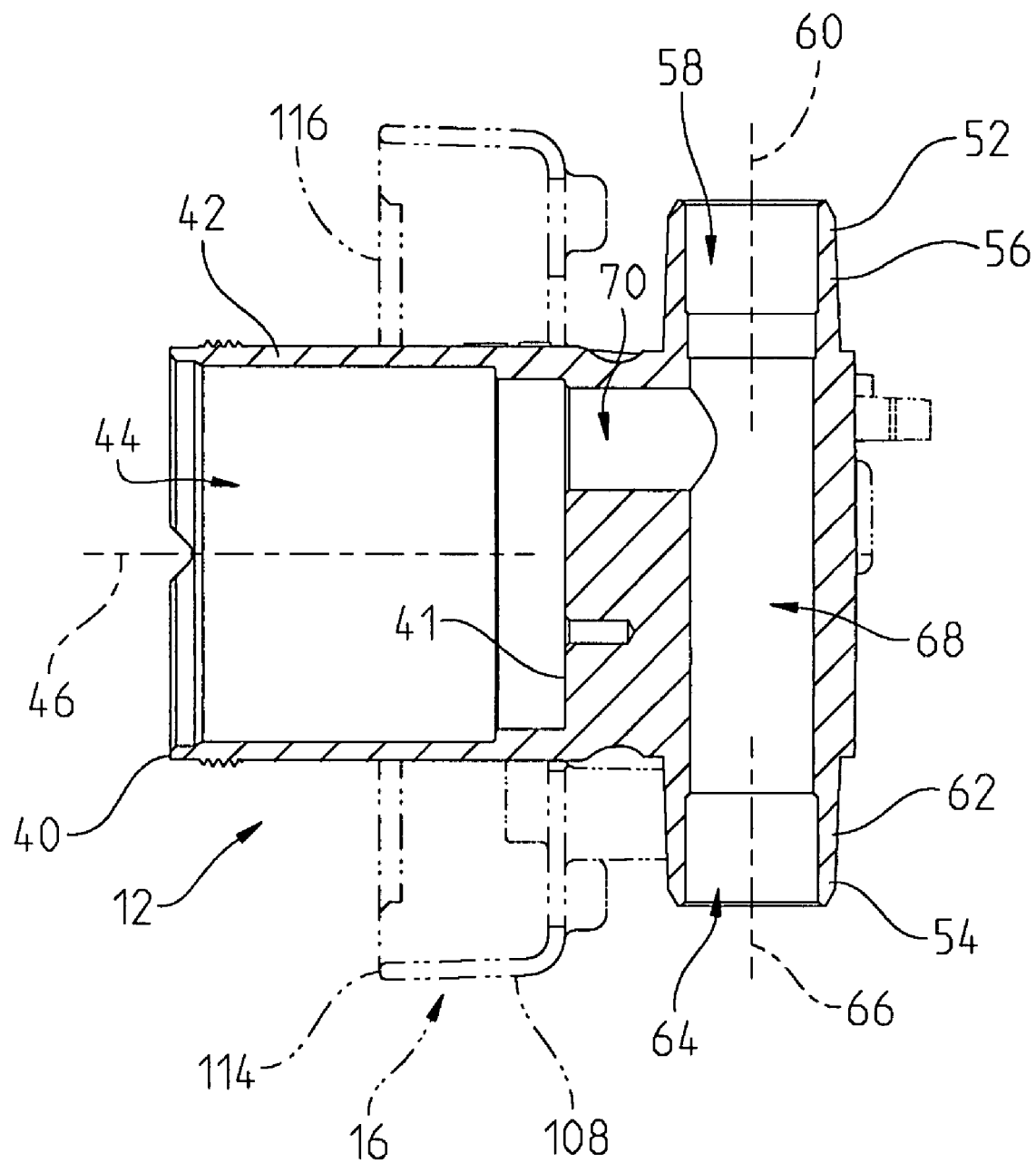
FIG. 8 is a cross-sectional view taken along line 8-8 of FIG. 4.

The valve fitting 12 further illustratively includes a mixing valve housing 40 having an end wall 41 and a cylindrical sidewall 42 defining a cavity 44 having a longitudinal housing axis 46. With reference to FIGS. 6 and 7, a first or hot water supply port 48 extends through the end wall 41 and is in fluid communication with the cavity 44. Similarly, a second or cold water supply port 50 extends through the end wall 41 and is in fluid communication with the cavity 44. The first stop valve 22a is configured to provide selective fluid communication between the bore 30 of the hot water inlet 24 and the hot water supply port 48. Similarly, the second stop valve 22b is configured to provide selective fluid communication between the bore 36 of the cold water inlet 26 and the cold water supply port 50.

With reference to FIGS. 2, 4, 5, and 8, the valve fitting 12 further includes a first outlet 52 and a second outlet 54. The first outlet 52 includes a tubular body 56 defining a first outlet bore 58 having a longitudinal first outlet axis 60, while the second outlet 54 includes a tubular body 62 defining a second outlet bore 64 having a longitudinal second outlet axis 66. In the illustrative embodiment, the first and second outlet axes 60 and 66 are co-axially aligned and extend substantially perpendicular to the hot and cold water inlet axes 32 and 38. A connecting bore 68 illustratively fluidly couples the first and second outlet bores 58 and 64 and, in turn, is fluidly coupled to the cavity 44 through an outlet port 70.

In one illustrative embodiment, the first outlet 52 is configured to be fluidly coupled to a conventional shower head through a shower riser (not shown). Further illustratively, the second outlet 54 is configured to be fluidly coupled to a conventional tub spout, illustratively including a diverter valve, through a delivery pipe (not shown). An illustrative arrangement is shown in U.S. Pat. No. 4,899,397 to Crawford et al., the disclosure of which is expressly incorporated by reference herein. In a further illustrative embodiment, an aspirator or ejector (not shown) may be positioned within the connecting bore 68 to produce a vacuum when water is flowing through the tub spout, thereby reducing leakage through the shower head. Illustrative aspirators are shown in U.S. Pat. No. 4,899,397 to Crawford et al. and U.S. Patent Application Publication No. 2007/0056639 to McNerney, the disclosures of which are expressly incorporated by reference herein.

The cavity 44 is configured to receive the valve cartridge 18, which is configured to control the flow of water from the hot and cold water supply ports 48 and 50 to the outlet port 70. A seal, such as an o-ring 71, is illustratively received intermediate the valve cartridge 18 and the valve housing 40. The valve cartridge 18 may be of conventional design. Conventional valve cartridges are disclosed in U.S. Pat. No. 4,901,750 to Nicholas et al. and U.S. Pat. No. 5,355,906 to Marty et al., the disclosures of which are expressly incorporated by reference herein.

The mounting bracket 14 is secured to the valve fitting 12 through conventional fasteners, such as screws 72. As shown in FIGS. 1 and 2, the mounting bracket 14 includes a base portion 74 having a pair of U-shaped mounting members 76 and 78 connected by a connecting member 80. The mounting members 76 and 78 include openings 82 and 84 for receiving one of the screws 72. The screws 72 are threadably received within mounting blocks 86 formed in the valve fitting 12.

The mounting bracket 14 further includes wall mounting tabs 88 extending outwardly from the base portion 74 in opposite directions. The wall mounting tabs 88 each include an aperture 90 to receive a conventional fastener, such as a screw (not shown). The mounting bracket 14 is configured to be secured to a wall support, typically a stringer, which is a horizontally mounted piece of wood positioned between two studs (not shown). The mounting bracket 14 may be similar to that disclosed in U.S. Published Patent Application No. 2006/0231140 to McNerney, the disclosure of which is expressly incorporated by reference herein.

The plaster guard 16 illustratively includes a body 92 having a substantially planar base 94 with a peripheral edge 96. The base 94 includes an opening 98 configured to cooperate with the valve fitting 12. The opening 98 includes a central portion 100 configured to receive the valve housing 40 and radially outwardly extending windows 102 configured to provide access to portions of the valve fitting 12 positioned behind the body 92 of the plaster guard 16. More particularly, the windows 102 are configured to provide access proximate to the inlets 24 and 26 and the outlets 52 and 54, respectively, of the valve fitting 12. A pair of escutcheon mounting holes 104 are provided within the base 94 of the plaster guard 16 and are positioned radially outwardly from the central portion 100 of the opening 98. The base 94 is substantially rectangular such that the peripheral edge 96 includes a plurality of sides defining a parallelogram with at least one right angle.

A flange 108 is supported by the base 94 of the plaster guard 16 and is positioned in spaced relation to the opening 98. The flange 108 is illustratively disposed adjacent to, and follows the contour of, the peripheral edge 96 of the base 94. As such, the flange 108 has a substantially rectangular cross-section in a plane extending transverse to the longitudinal axis 46 of the valve housing 40. The flange 108 extends from the base 94 in a direction away from the mounting bracket 14 substantially parallel with the longitudinal axis 46. In other words, the flange 108 extends outwardly toward a front end of the valve fitting 12.

Figure 4:
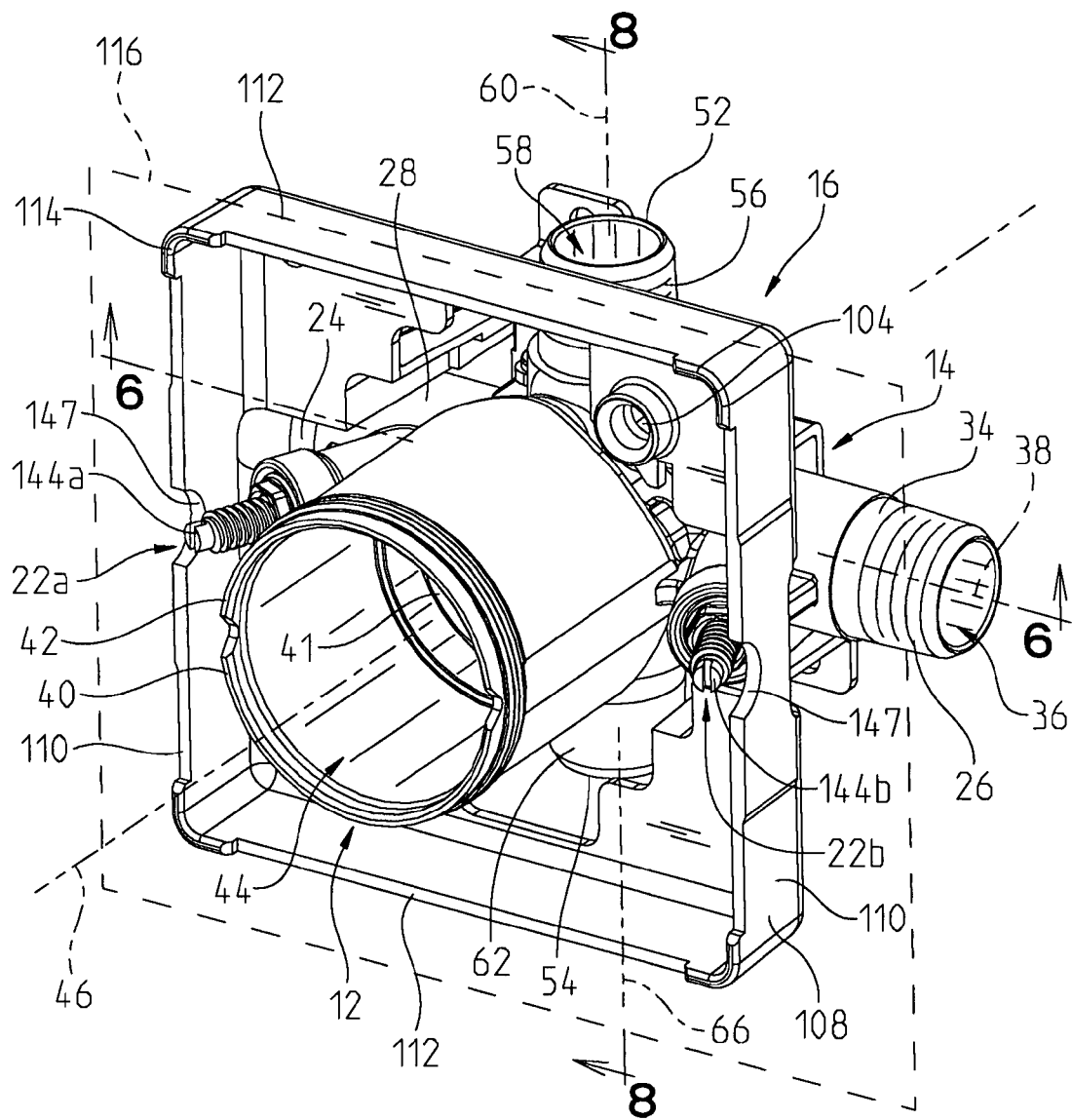
FIG. 4 is a perspective view of the valve fitting, plaster guard and mounting bracket of the mixing valve assembly of FIG. 1.
Figure 5:
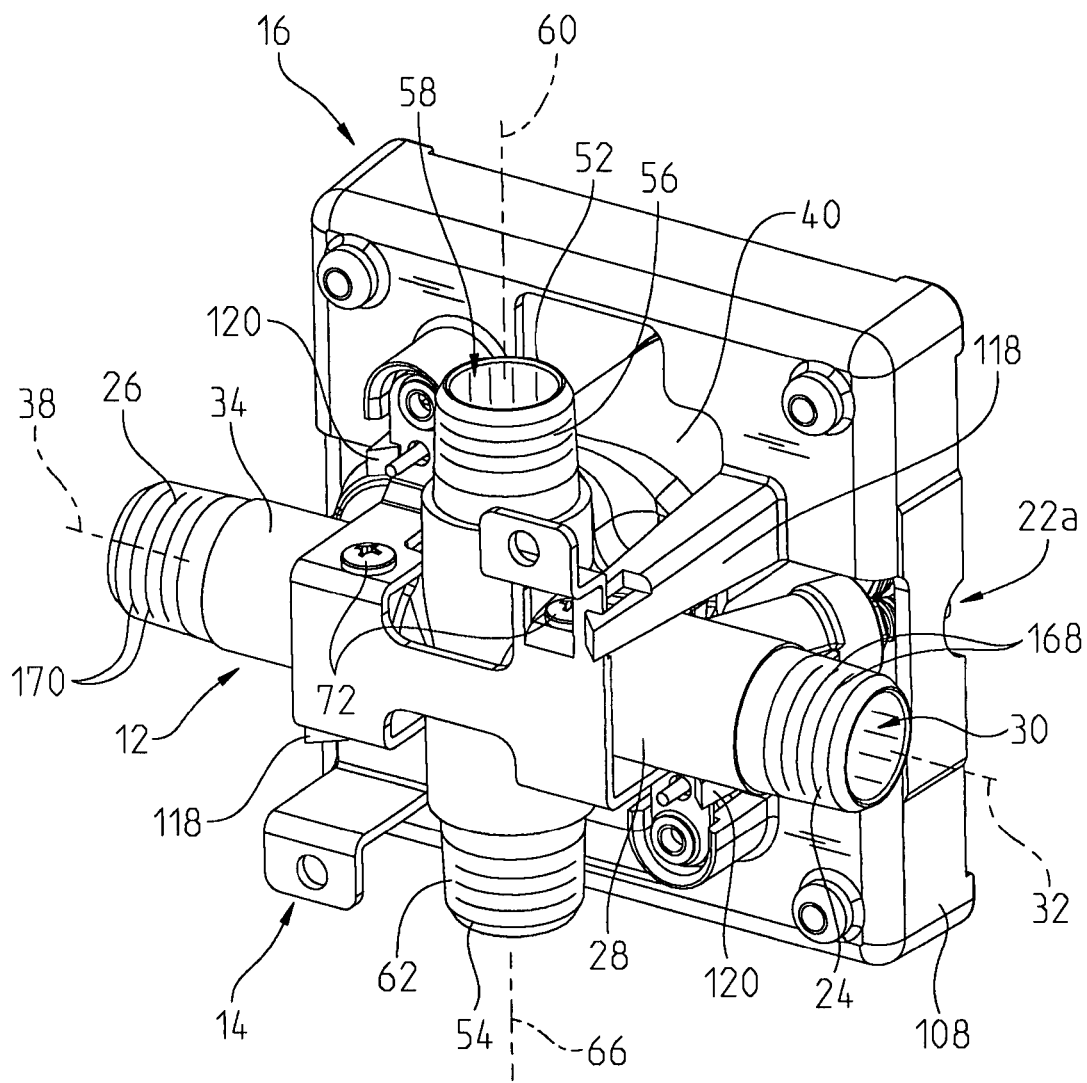
FIG. 5 is a rear perspective view of the valve fitting, plaster guard and mounting bracket of FIG. 4.

As shown in FIGS. 4 and 5, the flange 108 of plaster guard 16 includes a first pair of parallel sidewalls 110 and a second pair of parallel sidewalls 112. The first pair of parallel sidewalls 110 are connected to and disposed perpendicular to the second pair of parallel sidewalls 112. As such, the flange 108 has a substantially rectangular cross-section as identified above wherein the sidewalls 110 and 112 cooperate to define a parallelogram with at least one right angle. In one illustrative embodiment, the first and second pairs of parallel sidewalls 110 and 112 each have a length substantially equal to four inches, thereby defining a square cross-section having dimensions substantially equal to a standard wall tile. An outer edge 114 of the flange 108 defines an outer plane 116 extending transverse to the longitudinal axis 46 (FIGS. 4 and 6).

With reference to FIGS. 2 and 5, a plurality of couplers 118 and 120 are supported by a rear end of the plaster guard 16 and are configured to releasably couple the body 92 to the mounting bracket 14 and hence, the valve fitting 12. Additional details of an illustrative embodiment plaster guard are provided in U.S. Published Patent Application No. 2006/0231140 to McNerney, which has been expressly incorporated by reference herein.

In the following description, reference will be made to the hot water stop valve 22a as utilized to control the flow of water through the hot water inlet 24. It should be appreciated that the cold water stop valve 22b functions in an identical manner to control the flow of water through the cold water inlet 26. Identical components of the first or hot water stop valve 22a and of the second or cold water stop valve 22b will be identified with the reference numbers followed by the letter "a" or "b" respectively.

Figure 9:
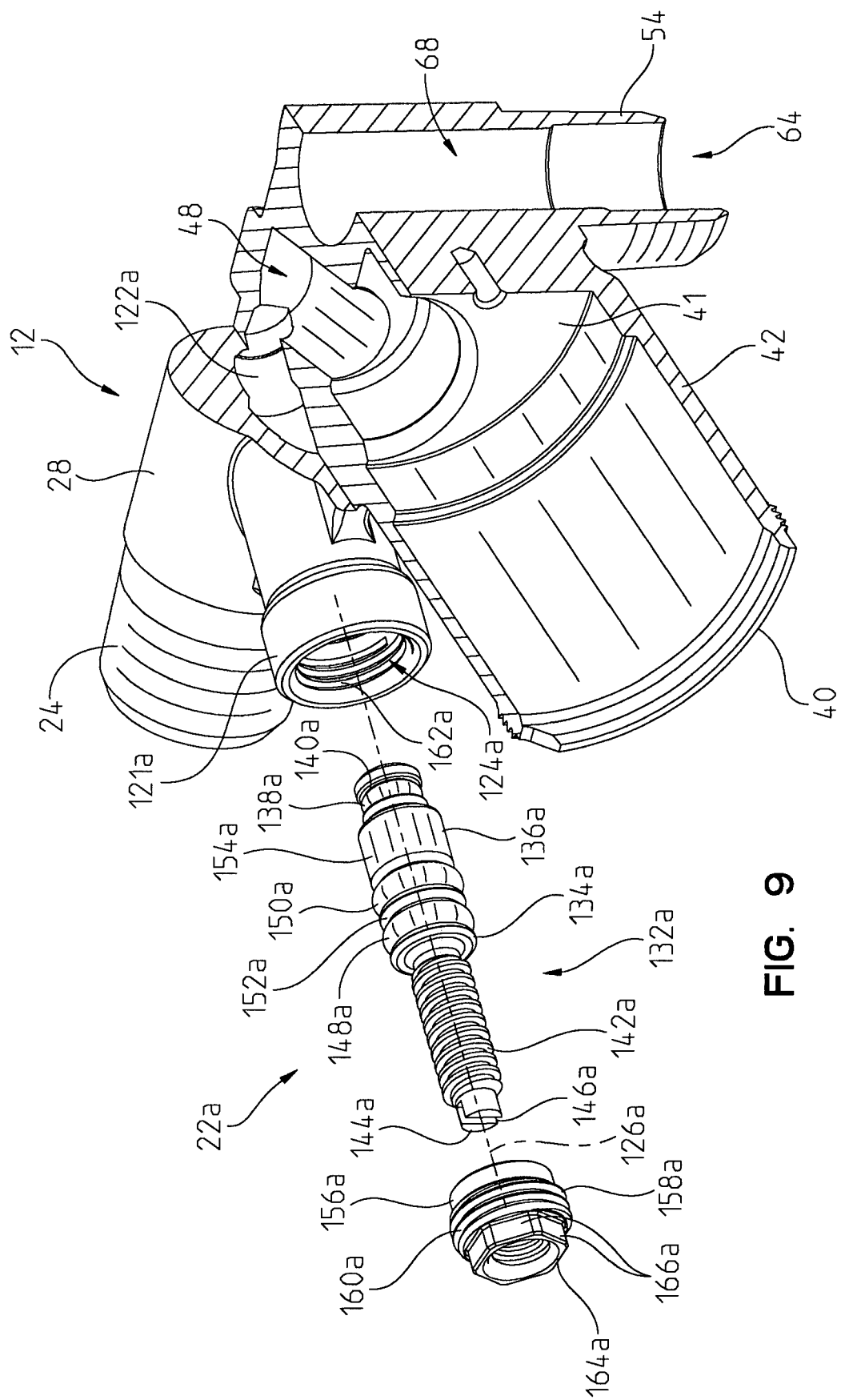
FIG. 9 is a detail exploded perspective view, in partial section, showing the stop stem and retainer removed from the receiving bore of the valve fitting.

With further reference now to FIGS. 6, 7, and 9, each stop valve 22a, 22b includes a stop housing 121a, 121b coupled to a respective inlet 24, 26, and a valve seat 122a, 122b supported within the inlet 24, 26. A receiving bore 124a, 124b extends through the stop housing 121a, 121b and intersects the respective inlet bore 30, 36. The receiving bore 124a, 124b defines a longitudinal stop axis 126a, 126b which is angularly offset relative to the housing axis 46 and to the respective inlet axis 32, 38. In other words, the receiving bore 124a, 124b intersects the inlet bore 30, 36 and extends substantially transversely across the inlet bore 30, 36 between opposing proximal and distal ends 128 and 130.

A stop actuator 132a, 132b is positioned within the receiving bore 124a, 124b and includes a stem 134a, 134b movable along the stop axis 126a, 126b. The stem 134a, 134b illustratively includes a piston 136a, 136b slidably movable within the receiving bore 124a, 124b between an open position, where water flows through the inlet 24, 26, and a closed position, where the piston 136a, 136b sealingly engages the valve seat 122a, 122b to prevent water from flowing through the inlet 24, 26. The piston 136a, 136b is configured to move from the open position (FIG. 6) across the inlet axis 32, 38 to the closed position (FIG. 7). A seal 138a, 138b is supported by a reduced diameter distal end of piston 136a, 136b and is selectively engageable with the valve seat 122a, 122b. Illustratively, the seal 138a, 138b comprises an o-ring received within an annular groove 140a, 140b formed at the distal end of the piston 136a, 136b and configured to radially seal the valve seat 122a, 122b when the piston 136a, 136b is in the closed position.

An externally threaded shaft 142a, 142b is formed integral with the piston 136a, 136b and includes an input or proximal end having a tool engaging member 144a, 144b. In the illustrative embodiment, the tool engaging member 144a, 144b includes a slot 146a, 146b for the receipt of a screwdriver (not shown). Clearance notches 147 are formed within the sidewalls 110 of the plaster guard 16 to facilitate access to the shafts 142a and 142b.

A pair of seals 148a, 148b and 150a, 150b are supported by the proximal end of the piston 136a, 136b. Illustratively, the seals 148a, 148b and 150a, 150b comprise o-rings received within annular grooves 152a, 152b and 154a, 154b and configured to provide a sliding, radial seal within the receiving bore 124a, 124b to prevent fluid flow past the piston 136a, 136b to the shaft 142a, 142b.

A retainer 156a, 156b is coupled to the stop housing 121a, 121b which defines a portion of the receiving bore 124a, 124b. More particularly, the retainer 156a, 156b illustratively includes a body 158a, 158b having a plurality of external threads 160a, 160b which are configured to engage a plurality of internal threads 162a, 162b formed within the receiving bore 124a, 124b. The proximal end of the retainer 156a, 156b includes a tool engaging member 164a 164b, illustratively a plurality of flats 166a, 166b configured to be engaged by a conventional wrench (not shown).

Figure 10:
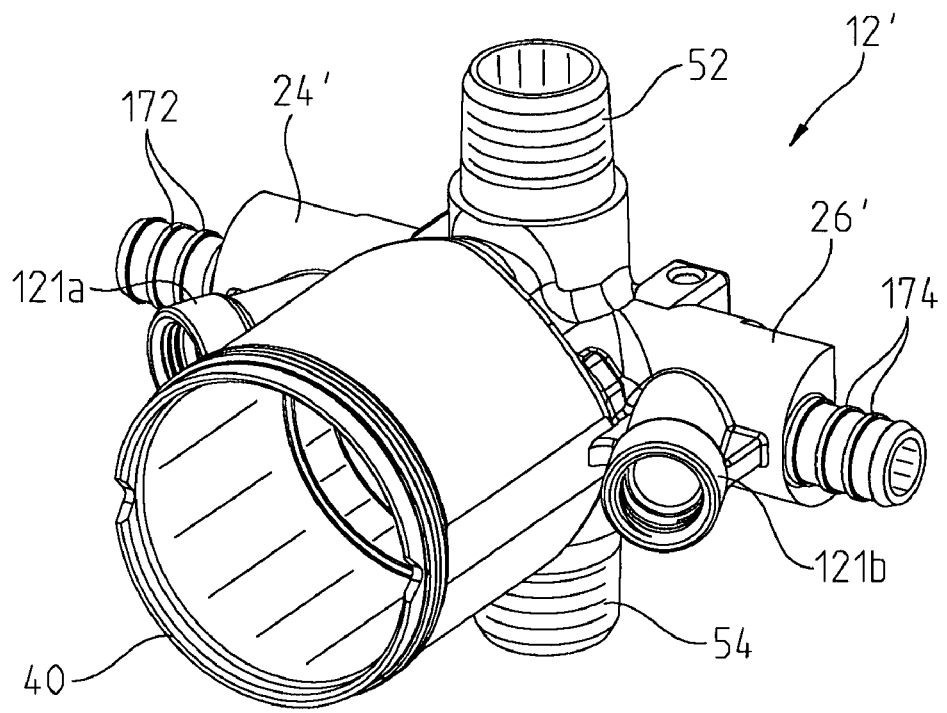
FIG. 10 is a perspective view of an illustrative embodiment valve fitting, with the stop actuators removed.
Figure 11:
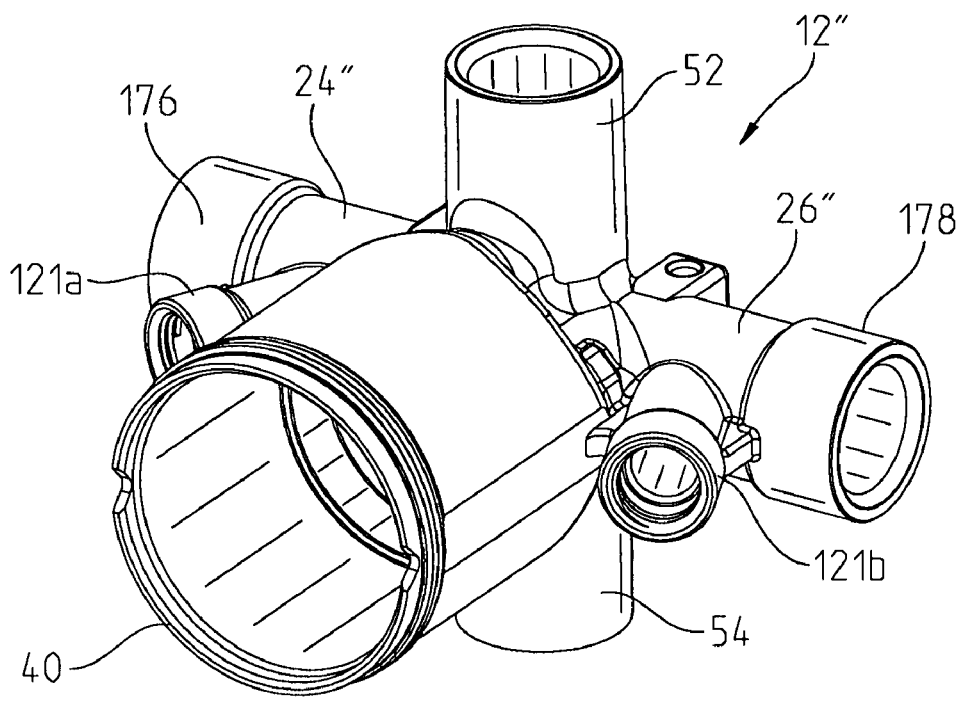
FIG. 11 is a perspective view of a further illustrative embodiment valve fitting, with the stop actuators removed.

With further reference to FIG. 5, the hot and cold water inlets 24 and 26 include external threads 168 and 170 formed on the tubular bodies 28 and 34 to facilitate connections with conventional internally threaded fluid couplings (not shown). As shown in FIG. 10, in a further illustrative embodiment valve fitting 12', the hot and cold water inlets 24' and 26' include annular projections or barbs 172 and 174 configured to be received within flexible tubing, such as cross-linked polyethylene (PEX). In another illustrative embodiment valve fitting 12", the hot and cold water inlets 24" and 26" may include enlarged portions 176 and 178 configured to receive tubing for coupling through conventional means, such as sweating.

During installation of the mixing valve assembly 10, the mounting bracket 14 is secured to a wall (not shown) so that the outer surface of the wall is substantially flush with, or in front of, the outer plane 116 of the plaster guard 16. Hot and cold water supplies (not shown) are fluidly coupled to the hot and cold water inlets 24 and 26, respectively. Similarly, the first and second outlets 52 and 54 are fluidly coupled to a shower head and a tub spout (not shown). The valve cartridge 18 is slidably received within the housing 40 and secured therein by the bonnet 20.

The stop actuators 132a and 132b are installed by threading the retainer 156a, 156b onto the shaft 142a, 142b of stem 134a, 134b. With the piston 136a, 136b in the fully open position (i.e., the piston 136a, 136b positioned proximate the retainer 156a, 156b, as shown in FIG. 6), the assembled retainer 156a, 156b and the stem 134a, 134b are then slidably pressed within the receiving bore 124a, 124b. A tool, such as a wrench (not shown) is then coupled to the tool engaging member 164a, 164b of the retainer 156a, 156b to secure the retainer 156a, 156b in place through engagement between threads 160a, 160b and 162a, 162b.

The stem 134a, 134b may be rotatably adjusted within the retainer 156a, 156b to axially move the piston 136a, 136b within the receiving bore 124a, 124b between the open and closed positions (FIGS. 6 and 7). Illustratively, a tool, such as a screwdriver (not shown), is used to access the tool engaging member 144a, 144b at the proximal or input end of the stem 134, which is positioned within the plaster guard 16. More particularly, the input end of the stem 134a, 134b is positioned within a dimensional envelope defined by the flange 108 of the plaster guard 16 and the outer plane 116. By rotating the stem 134a, 134b, the piston 136a, 136b moves in an axial direction within the receiving bore 124a, 124b and across the axis 32, 38 of the inlet bore 30, 36 such that the seal 138a, 138b sealingly engages the seat 122a, 122b, thereby preventing water flow through the inlet 24, 26.

Although the invention has been described in detail with reference to certain preferred embodiments, variations and modifications exist within the spirit and scope of the invention as described and defined in the following claims.

The invention claimed is:

1. A valve fitting comprising:

a mixing valve housing including a sidewall and a bottom wall defining a cavity having a longitudinal housing axis and configured to receive a mixing valve cartridge;

a first inlet coupled to the housing and including a first inlet bore having a longitudinal first inlet axis;

a first supply port extending into the bottom wall of the mixing valve housing and in fluid communication with the cavity of the housing;

a first stop valve including a first valve seat supported within the first inlet, a first receiving bore intersecting the first inlet bore and having a longitudinal first stop axis angularly positioned intermediate to the housing axis and the first inlet axis, and a first stem movable along the first stop axis intermediate the first inlet bore and the first supply port, the first stem including a seal configured to selectively engage the first valve seat to control water flow from the first inlet to the first supply port;

a second inlet coupled to the housing and including a second inlet bore having a longitudinal second inlet axis;

a second supply port extending into the bottom wall of the mixing valve housing and in fluid communication with the cavity of the housing; and a second stop valve including a second valve seat supported within the second inlet, a second receiving bore intersecting the second inlet bore and having a longitudinal second stop axis angularly positioned intermediate to the housing axis and the second inlet axis, and a second stem movable along the second stop axis intermediate the second inlet bore and the second supply port, the second stem including a seal configured to selectively engage the second valve seat to control water flow from the second inlet to the second supply port.

2. The valve fitting of claim 1, wherein the first stop axis is angularly offset from the housing axis by approximately 25 degrees, and the second stop axis is angularly offset from the housing axis by approximately 25 degrees in an opposite direction from the first stop axis.

3. The valve fitting of claim 1, wherein the first stop valve and the second stop valve include input ends that are received within a dimensional envelop having a width of less than 4 inches, and a length of less than 4 inches.

4. The valve fitting of claim 1, further comprising a plaster guard receiving the mixing valve housing and including a flange supported by the base and positioned in spaced relation to the mixing valve housing, the flange having an outer edge positioned in spaced relation to the base and defining an outer plane transverse to the housing axis, wherein the first stop valve and the second stop valve include input ends that are positioned within the flange and inwardly of the outer plane.

5. The valve fitting of claim 1, wherein:

the first stop valve includes a retainer operably coupled to the first receiving bore and including a plurality of internal threads, the first stem including a piston, a seal supported by the piston, and a shaft coupled to the piston and having external threads engageable with the internal threads of the retainer to move the piston relative to the first valve seat; and the second stop valve includes a retainer operably coupled to the second receiving bore and including a plurality of internal threads, the second stem including a piston, a seal supported by the piston, and a shaft coupled to the piston and having external threads engageable with the internal threads of the retainer to move the piston relative to the second valve seat.

6. The valve fitting of claim 5, wherein:

the first receiving bore includes a plurality of internal threads and the first retainer includes a plurality of external threads operably coupled to the internal threads of the first receiving bore; and the second receiving bore includes a plurality of internal threads and the second retainer includes a plurality of external threads operably coupled to the internal threads of the second receiving bore.

7. The valve fitting of claim 1, wherein a first stop housing defines the first receiving bore, and a second stop housing defines the second receiving bore, the mixing valve housing being integral with the first stop housing and the second stop housing.

8. The valve fitting of claim 1, wherein the longitudinal first inlet axis is co-axially aligned with the longitudinal second inlet axis.

* * * * *